March 18, 1924. 1,487,329
R. T. HAZELTON
SIMPLIFIED UNIVERSAL MILLING MACHINE
Filed Nov. 8, 1919   10 Sheets-Sheet 4
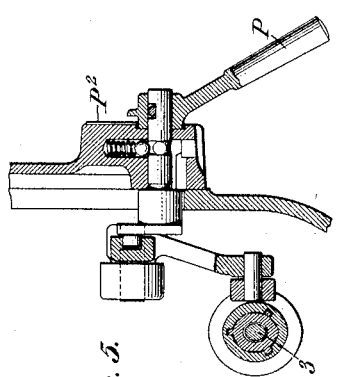
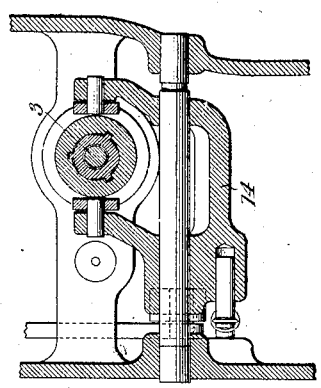
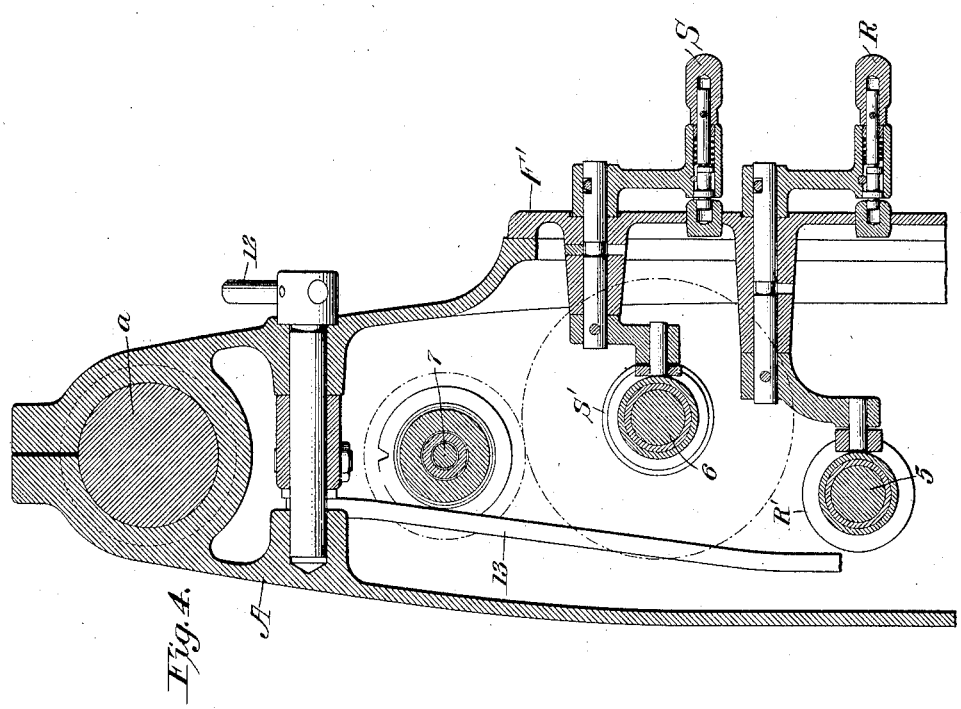

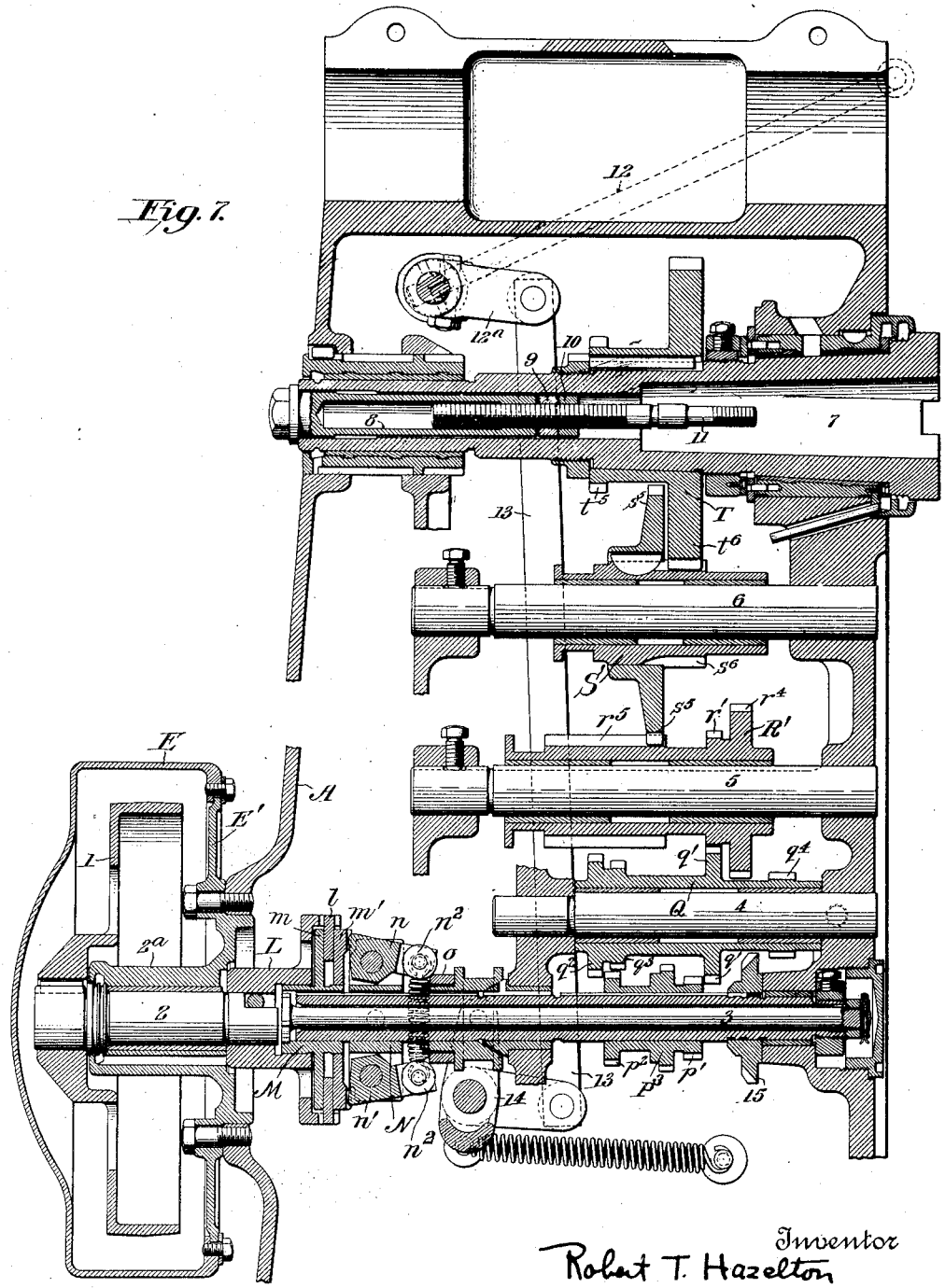

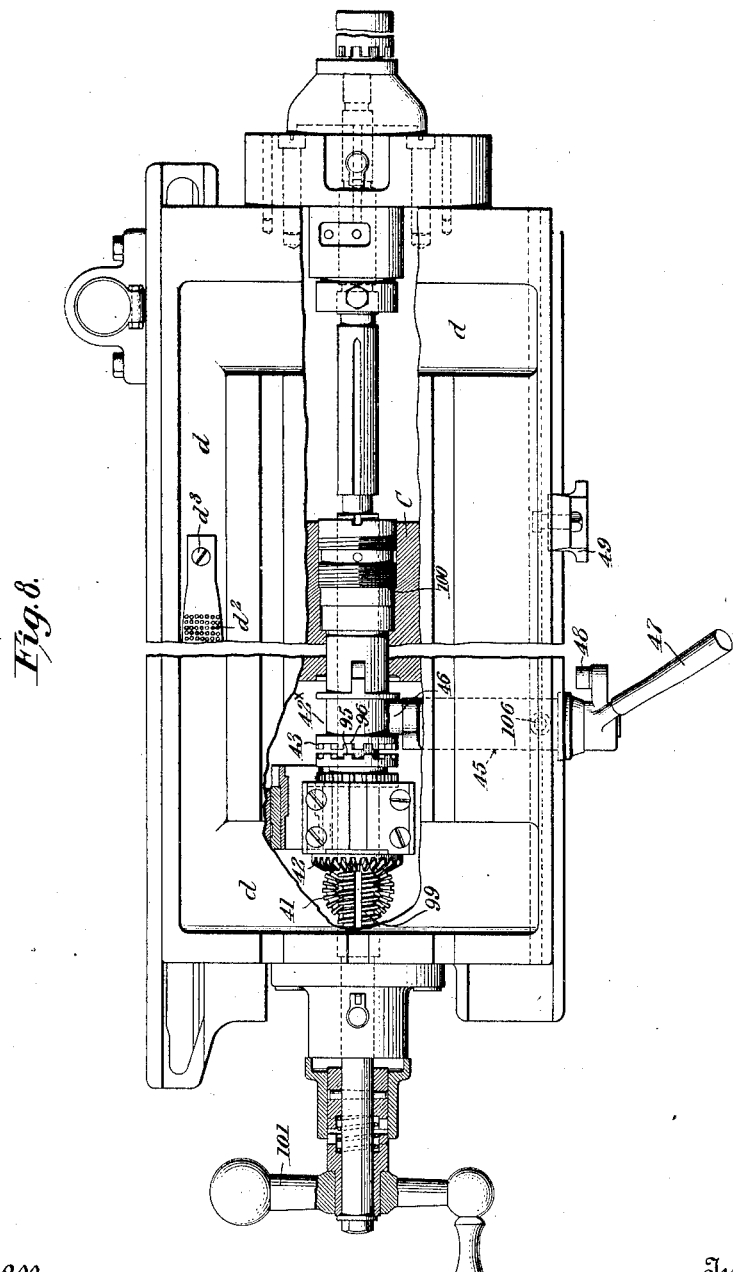

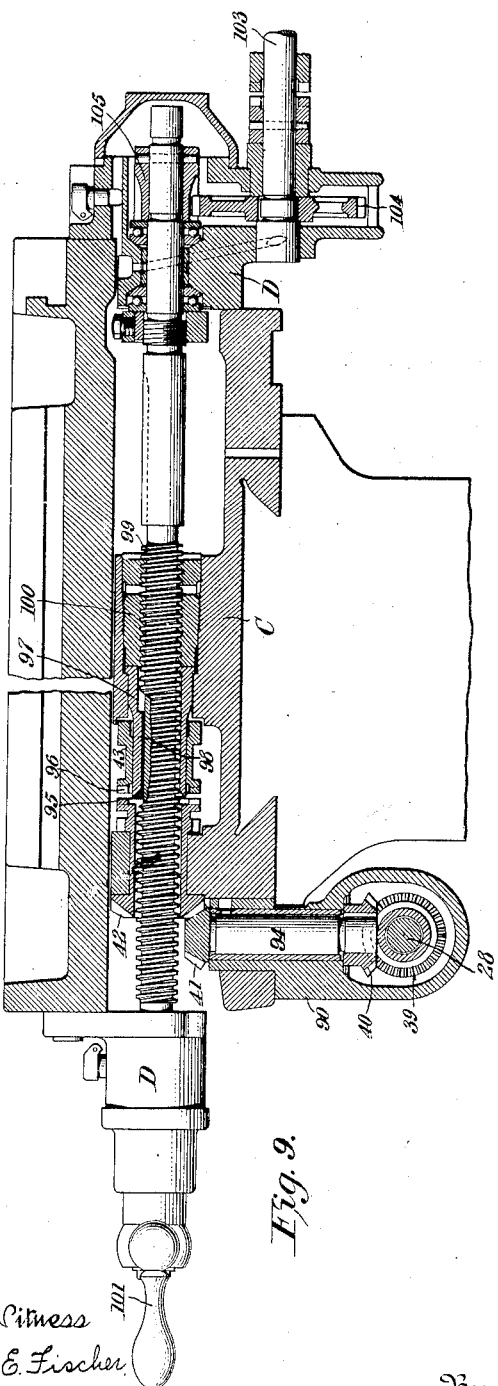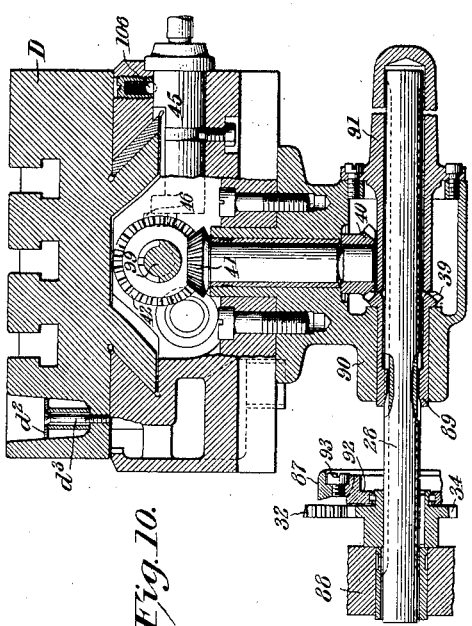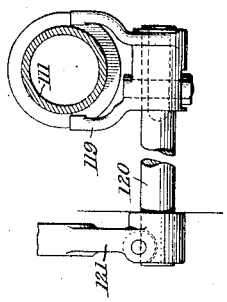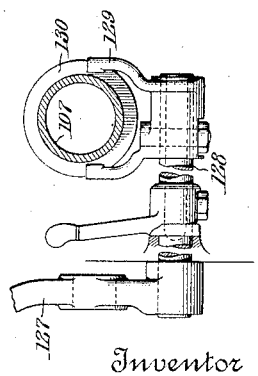

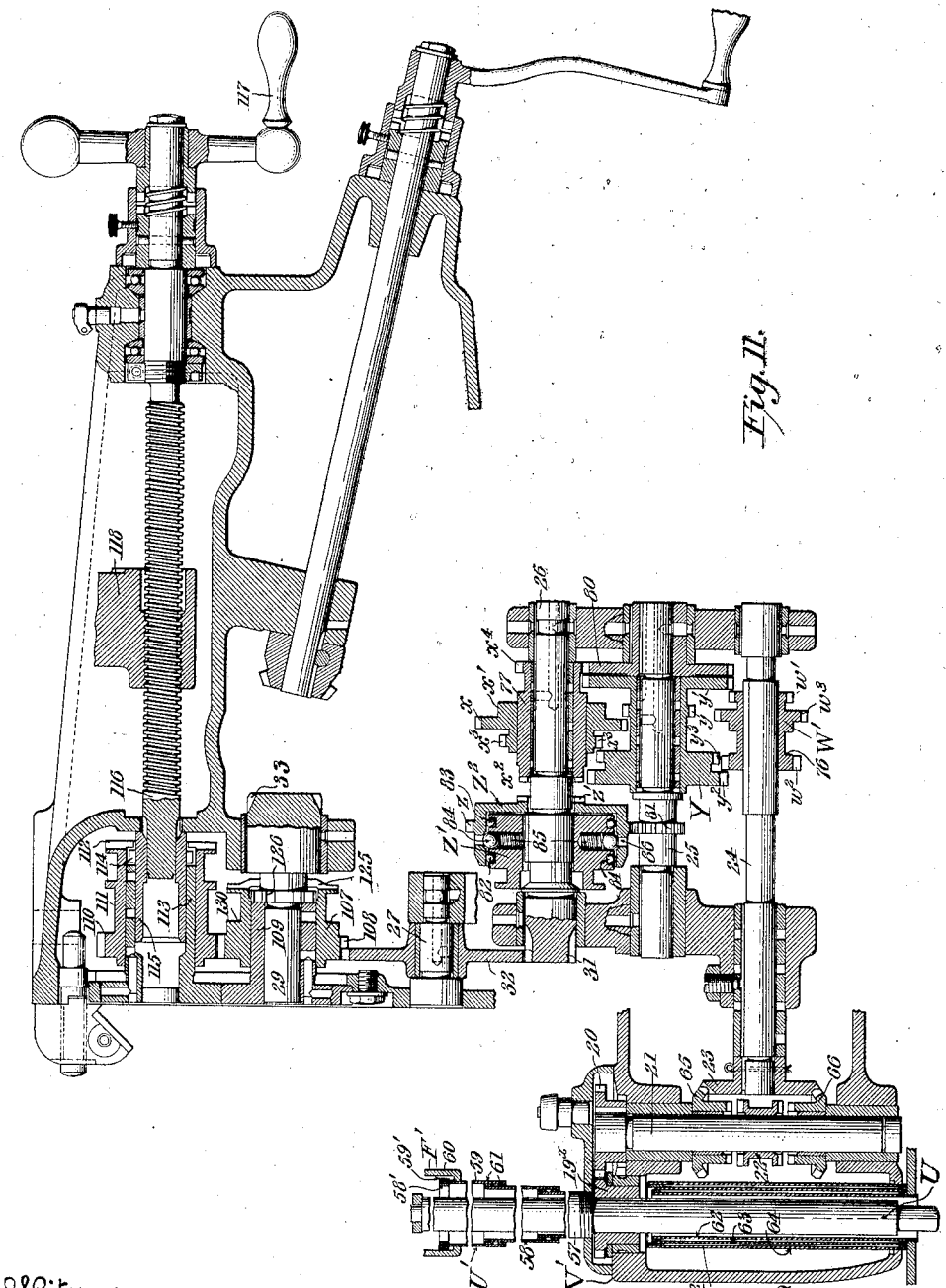

March 18, 1924.
R. T. HAZELTON
SIMPLIFIED UNIVERSAL MILLING MACHINE
Filed Nov. 8, 1919   10 Sheets-Sheet 9
1,487,329
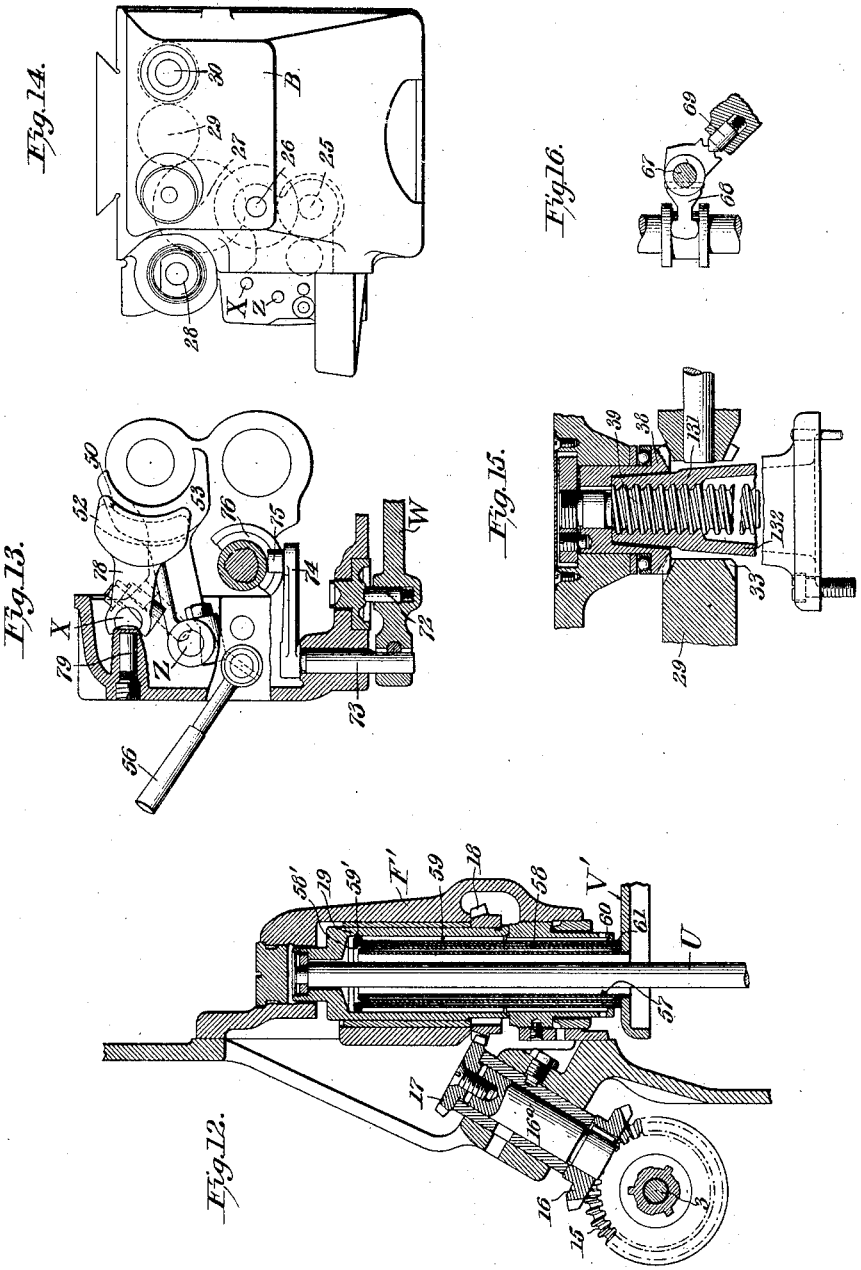
WITNESS
L. E. Fischer.
INVENTOR
Robert T. Hazelton
BY
Albert F. Nathan
ATTORNEY

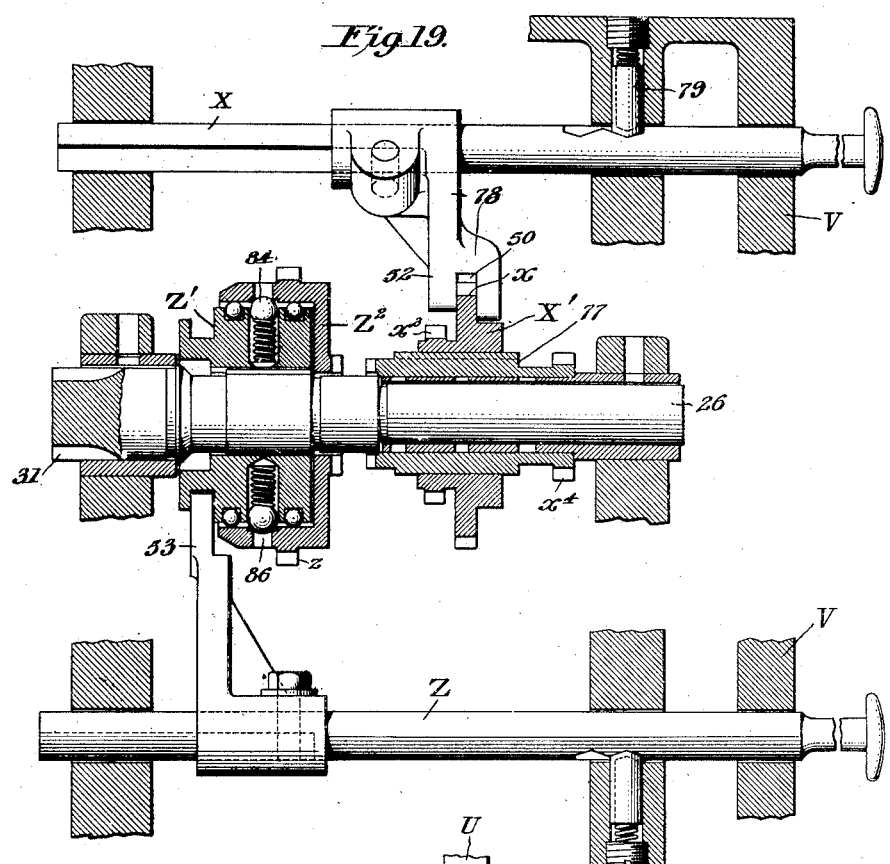
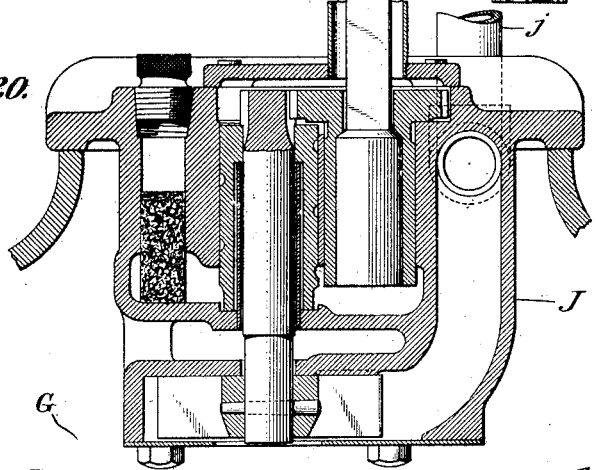

Patented Mar. 18, 1924.

1,487,329

UNITED STATES PATENT OFFICE.

ROBERT T. HAZELTON, OF CINCINNATI, OHIO, ASSIGNOR TO THE CINCINNATI MILLING MACHINE COMPANY, OF CINCINNATI, OHIO, A CORPORATION OF OHIO.

SIMPLIFIED UNIVERSAL MILLING MACHINE.

Application filed November 8, 1919. Serial No. 336,664.

*To all whom it may concern:*

Be it known that I, ROBERT T. HAZELTON, a citizen of the United States, and residing at Cincinnati, in the county of Hamilton and State of Ohio, have invented a new and Improved Simplified Universal Milling Machine, of which the following specification is a full disclosure.

This invention relates to milling machines and it deals more particularly in improvements and refinements in various features of the organization thereof. The primary object in the development of this invention has been to simplify the mechanism in general and in detail so far as possible and to secure a rugged and durable and accurate construction.

In detail, further objects have been to make a better provision for the circulation of the coolant fluid so that it will be collected in all positions of the table and accurately conveyed to its reservoir. Also to make provision for adequately encasing all rotating elements in the interest of safety and to do so without interfering with the mobility of the various elements and without resorting to mechanically complicated expedients. Also, to so arrange the various control levers and elements that the machine may be operated with facility without compelling the attendant to move about from one position to another.

Other objects will be in part obvious from the annexed drawings and in part indicated in connection therewith by the following analysis of the invention.

This invention accordingly consists in the features of construction, combination of parts and in the unique relations of the members and in the relative proportioning and disposition thereof; all as more completely outlined herein.

Figure 1:
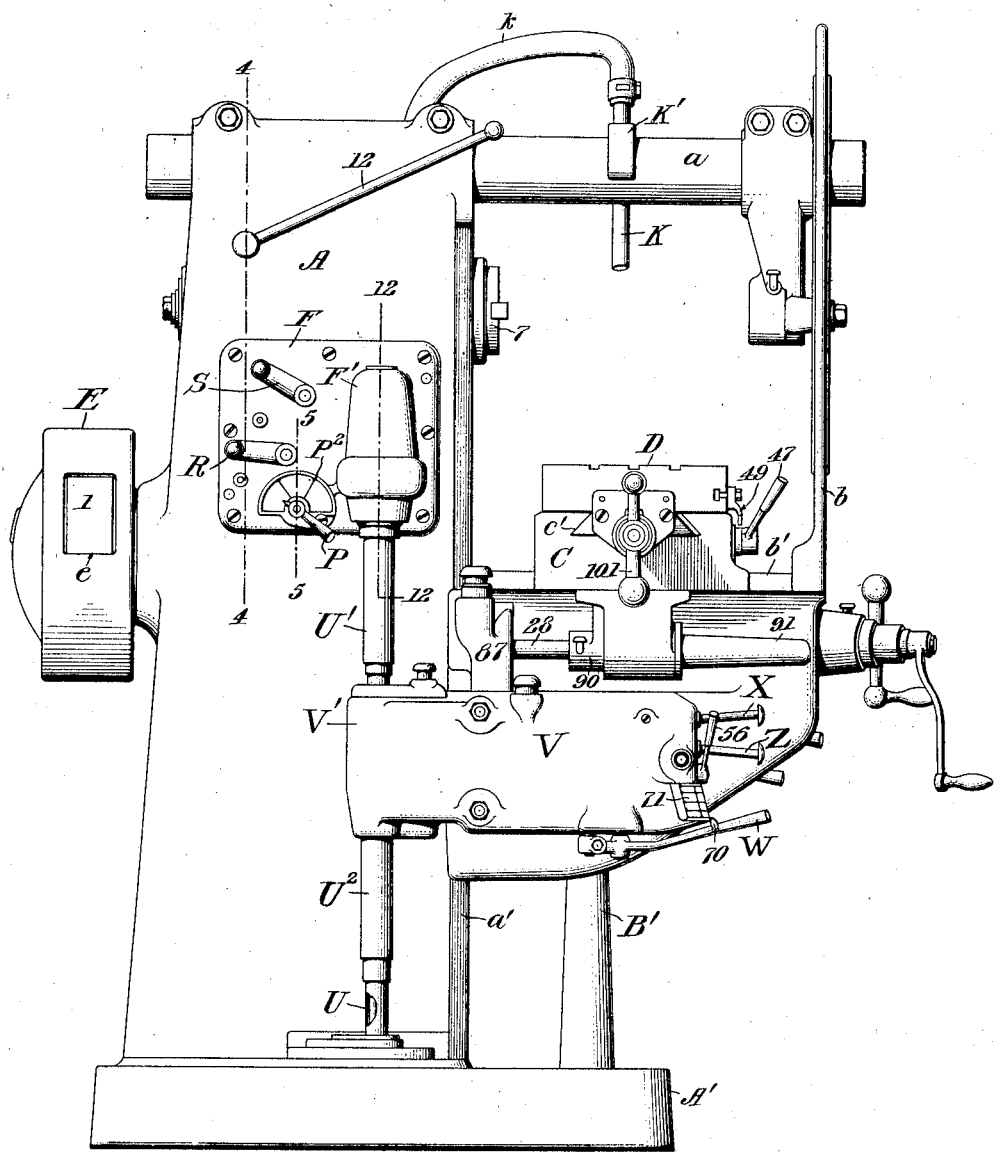
Figure 2:
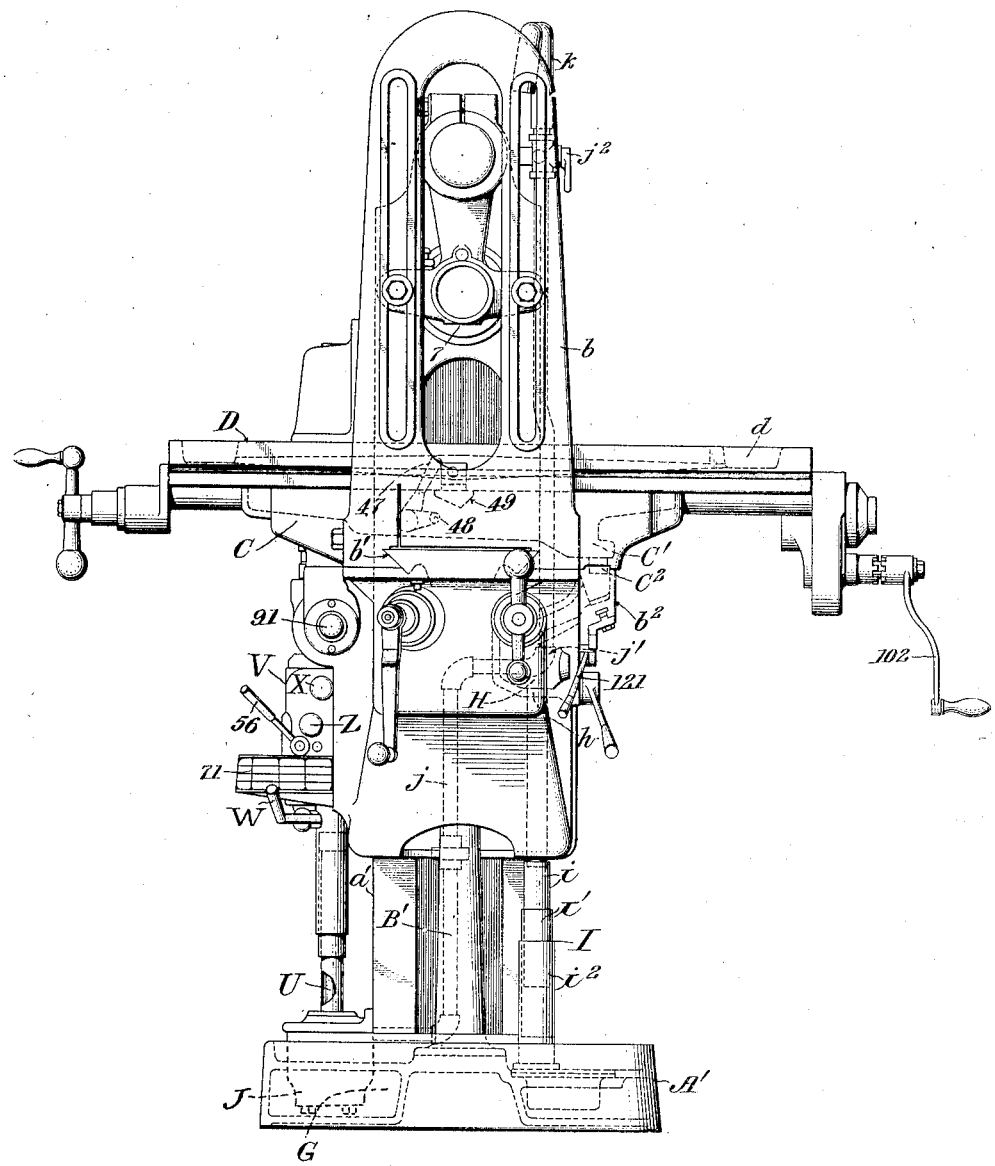
Figure 3:
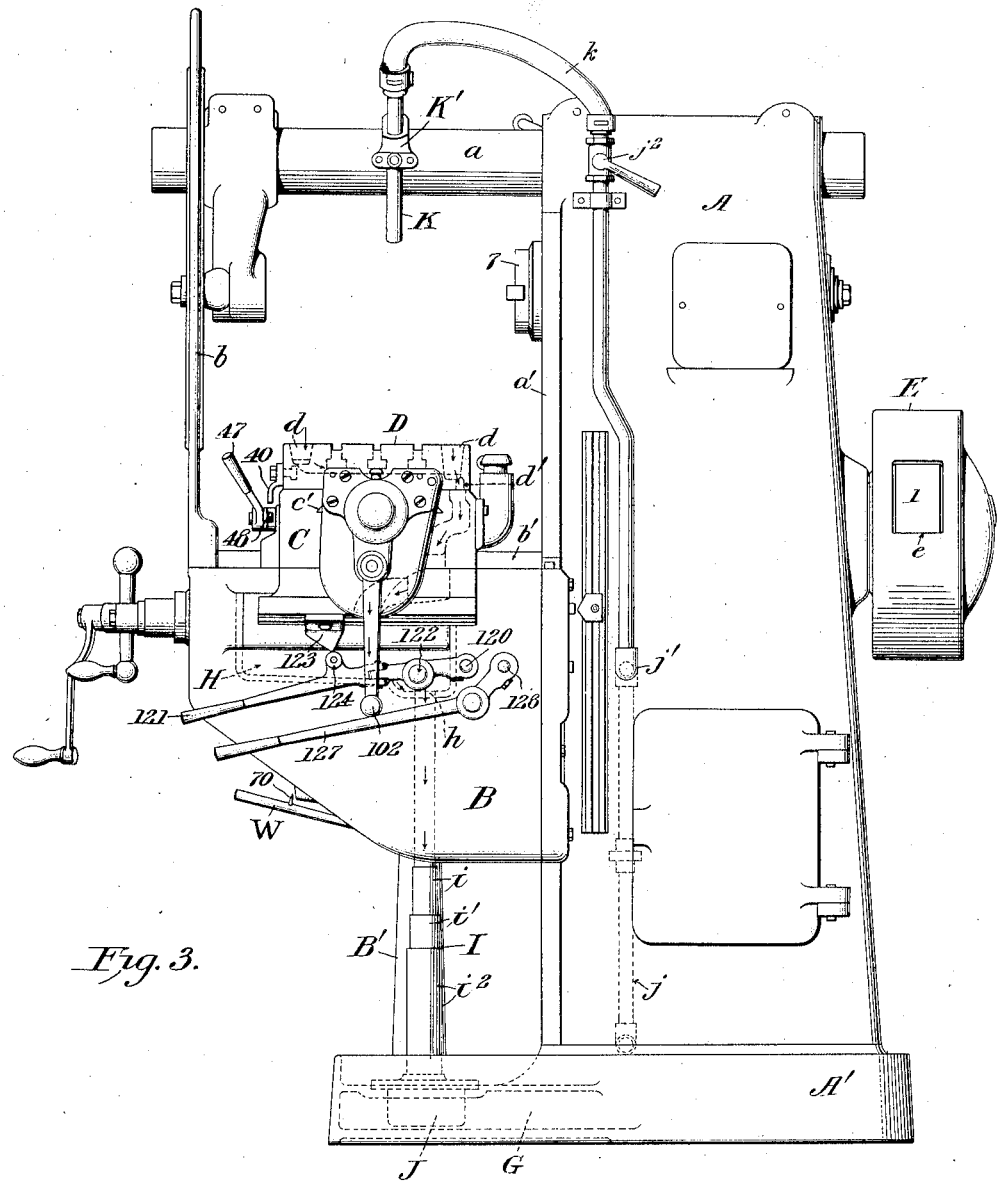

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:

Figs. 1, 2 and 3 are left side elevations, front elevations and right side elevations, respectively, of the machine. Fig. 4 is a vertical section through the column taken along line 4—4 of Fig. 1. Fig. 5 is a vertical detailed section through line 5—5 of Fig. 1. Fig. 6 is a sectional detail of one of the lever controls. Fig. 7 is a development in vertical section of the transmission from the main pulley to the spindle, showing the means for engaging and disengaging the drive and for regulating the rotational ratios, together with other improved details. Fig. 8 is a plan, partly in section, of the table and its propelling elements. Fig. 9 is a vertical longitudinal section taken through the table shown by Fig. 8. Fig. 10 is a transverse section through the table propelling transmission carried by the saddle. Fig. 11 is a layout of the transmission extending from the vertical shaft journaled on the column, to the knee elevating mechanism, and also to the saddle propelling mechanism. Fig. 12 is a vertical detail through line 12—12 of Fig. 1, showing the connection between the power driven shaft within the column and the transmission shaft vertically extending exteriorly of the column, and it conveys motion to the table, saddle, or knee, as the case may be. Fig. 13 is a vertical detail showing the arrangement of the gear shifting levers for varying the rate of travel of the table. Fig. 14 is a front elevation of the knee, showing the relative disposition of the various shafts mounted therein. Fig. 15 is a vertical elevation showing details of the knee elevating mechanism. Fig. 16 is a detail of the detent for holding the direction-controlling clutch in its various positions. Fig. 17 is a detail of the means for controlling the vertical feed. Fig. 18 shows the control for the power feed for the saddle. Fig. 19 is a development of the mechanism for varying the rate of travel of the table and Fig. 20 is a vertical section of a coolant pump together with its actuating mechanism.

Referring to the drawings, A, B, C, and D indicate frame-elements of a machine tool organization. These frame-elements may assume various forms. Thus, as exemplified by the embodiment herein illustrated, the frame-element A assumes the form of a column of a milling machine which rests directly upon the ground and carries the weight of the other frame-elements. B indicates the knee which is supported by an adjustable leg B' whereby it is raised or lowered along the slideway $a'$ provided by the column. The knee is also provided with a slideway $b'$ extending directly transversely to the column. A so-called saddle C is carried by the slideway $b'$ so as to be bodily adjustable toward and away from the column, and said saddle is provided with a slideway $c'$ extending transversely to the slideways $a'$ and $b'$ so as to support and guide a table D arranged to reciprocate to and fro underneath and transversely to the over-arm $a$ clamped in the upper portion of the column A and reinforced by a bracket $b$ uprising from the knee B.

The base $A'$ of the column is made hollow so as to provide a chamber G for receiving and retaining the coolant employed for the purpose of lubricating or cooling the cutter or other tool while at work. Provision is made for a continuous circulation of this fluid and, to that end, the exposed upper surface of the table D is provided with side and end grooves $d$ sloping downwardly toward a drain port $d'$ covered by a screen $d^2$ movably held in place by means of screws $d^3$ shown in detail by Fig. 10. The drain port $d'$ is located midway the ends of the rear longitudinal groove provided by the table so that, in all positions of the table, it will lead directly into an elongated chamber $C'$ provided by the saddle. This chamber $C'$ is open on top and closed on its sides by walls forming a part of the casting of the saddle, and the bottom of the chamber $C'$ slopes downwardly to the right to direct the returning coolant into the drain-port $C^2$ which discharges directly into a side-conduit $b^2$ arranged at the right side of the knee. This knee, as shown by dotted lines in Figs. 2 and 3, is interiorly formed with a chamber H having a drain-port $h$ connected with the chamber G in the base of the column by means of a telescopic pipe I. This pipe consists of several sections $i$, $i'$, $i^2$, etc., having the lower end of the one shouldered with respect to the upper end of its companion so that, when the knee is elevated, the sections will be extended without being separated, after the manner of an ordinary telescope. This telescopic conduit is located inconspicuously underneath the knee and, by this construction, a clean, compact and efficient return of the coolant is insured without resorting to the use of exposed flexible piping which is always more or less in the way. The coolant is continuously carried from the reservoir G to the work by means of a pump and a conduit passing mainly through the column and terminating externally in a nozzle capable of being adjustably positioned. This pump is indicated by J on Fig. 3 and is driven by a shaft U, shown on Figs. 1, 2, 11 and 12, extending vertically alongside of the column. The pump J draws the coolant from the reservoir and forces it into a pipe $j$ which extends upwardly within the column and merges from the same at some suitable point, such as $j'$, and is provided with a hand controlled valve $j^2$ near the upper end of the column for the purpose of discontinuing the flow of the coolant. A short pipe or nozzle K is by means of a suitable bracket $K'$, adjustably supported by the over-arm $a$ so that the attendant may cause a copious flow of coolant to be delivered directly to the cutter carried by the usual arbor arranged co-axially with the spindle 7. A flexible hose $k$ connects the upper end of the pipe $j$ with the nozzle K.

The spindle driving transmission will now be described. Bolted to the rear face of the column is a belt guard E having slots $e$ for receiving the belt. This guard completely encases a rotating pulley 1 (see Fig. 7) which is keyed to a shaft 2 journaled in a bearing $2^a$ extending from a casting $E'$ bolted to the column A. This shaft 2 is keyed to a clutch member L forming one part of a friction clutch and connected with a friction disk $l$. This friction disk may be clamped between the two annular members $m$ and $m'$ mounted on a member M forming the other part of the friction clutch; said part M being secured to a shaft 3 extending into a speed change box F inserted into an opening in the side wall of the column and bolted thereto, as indicated by Fig. 1. The actuation of the shiftable disk $m'$ is controlled by means of levers $n$ and $n'$ pivoted onto a collar N and operated by an annular wedge $o$ bearing against rollers $n^2$. The annular wedge $o$ is in turn carried by a grooved collar which is shiftable by means of a bell crank lever 14 operated by an elongated link 13 extending upwardly within the column and connected at its upper end to the short arm $12^a$ of an externally located operating lever 12 having its handle arranged near the front of the column, so as to be conveniently accessible to the attendant. By means of this mechanism, the main pulley may be caused to run idly, or it may be caused to rotate what may be regarded as the main driving shaft 3 of the machine. From this shaft 3, the motion of the spindle is derived through suitable speed change gearing and also, from this same shaft 3, power is derived for operating the pump and for imparting motion to either one or the other of the movable frame elements, to wit, the table, the knee, or the saddle, through the transmission elements subsequently to be described.

The transmission for rotating the spindle is in large part arranged in a speed box F and includes shafts 3, 4, 5 and 6, arranged in parallelism and suitably spaced to insure the meshing of gears carried thereby. The shaft 3 carries a shiftable gear unit P' carrying gears $p'$, $p^2$ and $p^3$. This gear unit is shiftable into any one of three gear meshing positions and also into the neutral non-meshing positions shown by Fig. 7, by means of an externally located hand lever P having an indicating finger cooperating with suitable designations on an index plate $P^2$. By thus shifting the gear unit P', any one of its gears may be meshed with the appropriate gear $q'$, $q^2$ and $q^3$ carried by the gear unit Q journaled on the shaft 4. The hand lever R enables the gear unit R' to be shifted on the shaft 5 so as to bring either its gear $r'$ into mesh with the gear $q'$, or its gear $r^4$ into mesh with the gear $q^4$ carried by the gear unit Q. The gear unit R' also carries an elongated gear $r^5$ in continuous mesh with the gear $s^5$ carried by the gear unit S' which is shiftable by means of a hand lever S so as to bring either its gear $s^5$ or its gear $s^6$ into mesh with the gear $t^5$ or the gear $t^6$ carried by the gear unit T keyed to the spindle 7. By this means, twelve different speeds may be imparted to the spindle.

A unique feature in the construction of the spindle is shown by Fig. 7 and consists in an arrangement whereby a single draw-in rod may be used for retaining various sizes of collets. Milling machines, as heretofore constructed, have their spindles provided with a tapering opening adapted to receive various cutter-holding arbors. These arbors are of various sizes and their shanks differ in diameter as well as in length for the various diameters and lengths of arbors and it has heretofore been customary to supply a number of separate draw-in bolts to take care of these differences in dimensions. As a result of the adjustable bolt shown in Fig. 7, it will serve for all different arbor proportions. In this construction, a threaded bolt 11 is received by a tubular part 8 and, by means of lock nuts 9 and 10, may be rigidly secured thereto in any desired position corresponding to the arbor employed. The exposed end of the part 8 is provided with a nut whereby the entire unit may be rotated by means of a wrench, as will be understood.

The drive for the pump, as well as for the table, knee, or saddle, is derived from a beveled gear 15 keyed to the main drive shaft 3. This beveled gear is permanently in mesh with a beveled gear 16 secured to a stub shaft 16$^a$ journaled in the wall of the column and disposed in a vertical plane at an angle extending upwardly and outwardly so as to bring beveled gear 17, secured at its upper end, into meshing relation with a beveled gear 18 keyed to a sleeve 19 secured to a vertical shaft U journaled (by means of the sleeve 19) in the casing F' forming a bay of the plate F bolted to the side of the column. The lower end of the shaft U terminates in the pump J and maintains the same continuously in operation so long as the clutch members M and L are engaged to drive the shaft 3.

Bolted to one side of the knee B is a feed change box V which encases that part of the transmission constituting the feed change mechanism. This box V extends rearwardly and provides a tubular portion V' which circumscribes the shaft U and has an operative connection with the upper and lower telescopic protectors U' and U$^2$ which shield the rotating shaft U against any possibility of contact with the clothing of the attendant. At the same time, the extension V' provides bearings for a gear 19$^x$ splined to the shaft U so as to be constantly driven thereby in all positions of the knee. The telescopic tube U' consists of a tube 57 screw-threaded to the upper aperture of the extension V' so as to move bodily therewith. Tubes 58 and 59 are free-floating and rest upon the upper portion of extension V' except when their shoulders 59' and 58' are engaged by conversely arranged shoulders 60 (on the bay F') and 61 (on the lower part of the tube 59), etc., as will be clearly understood from the drawing.

In like manner, the lower telescopic tube U$^2$ consists of a plurality of tubes 62, 63 and 64 capable of being nested within the extension V' when the knee is in its lowermost position, as shown by Fig. 11, and capable of being telescopically extended when the knee is elevated, as shown by Fig 1.

The transmission from the vertical shaft U may now be described. A shaft 21 is journaled vertically in the feed box V, near the vertical shaft U, and is driven continuously by means of a gear 20, meshing with gear 19$^x$ splined to shaft U. A clutch 22 enables shaft 21 to be operatively connected either with beveled gear 65 or 66, thereby causing either one or the other of these gears to propel the beveled gear 23 in one direction or the other, as the case may be. This constitutes the main reversing mechanism and it effects a general reversal of all motions of the knee, saddle, or table, respectively. The shifting of the clutch 22 is effected by means of a lever 56 arranged at the forward end of the gear box V where it is immediately accessible to the attendant. This lever is connected with the clutch 22 by means of a shaft 67 carrying a clutch operator 68 adapted to be retained in either one of its two effective, or its neutral, positions, by means of the detent device 69 shown by Fig. 16. When in its neutral position, no motion is transmitted beyond the shaft 21.

The feed change box carries a plurality of parallel shafts 24, 25 and 26, supporting gear units for effecting feed changes, as will be described. Splined to shaft 24 is a gear unit W' which is operated by a lever W, the handle of which is accessible from the front of the machine, and has a pointer 70 (see Fig. 1) indicating either one of four vertical columns on an index plate 71 secured to the front end of the feed box V. This lever W is provided with a detent device 72 (see Fig. 13) for holding it in the predetermined position and the lever is keyed to a pivot shaft 73 from the upper end of which extends an arm 74 terminating in a pin 75 riding in the circular groove 76 of the gear unit W' so as to control the position thereof. The gear unit carries three change gears $w'$, $w^2$ and $w^3$ capable of being shifted into mesh with corresponding gears $y'$, $y^2$ and $y^3$ carried by the intermediate gear unit Y loosely journaled on the shaft 25. Shiftably splined to a sleeve 77, is a gear unit X' carrying gears $x^3$ and $x$ adapted to be meshed with gears $y^3$ and $y$ on the intermediate Y, so as to derive motion therefrom and communicate said motion to said sleeve 77. The shifting of the gear unit X' is accomplished by means of a bifurcated shifter 52 having in its end a segmental groove 50 adapted to receive a portion of the periphery of the gear $x$ and act against the sides thereof for the purpose of shifting the gear unit X'. This shifter 52 is connected with a shifting rod X by means of an arm 78. The longitudinal position of the shifter rod X is retained by a detent device 79 and the rod extends forwardly through the forward end of the feed box V and terminates in an operating knob accessible from the front of the machine.

The motion of the sleeve 77 is transmitted to the shaft 26, either directly through the clutch teeth $x^2$ (through the device Z') or in a roundabout way, by means of the gear $x^4$ which permanently meshes with a gear 80 keyed to the shaft 25 which carries a gear 81 which may be engaged by the shiftable gear $z$ carried by the member $Z^2$. This member $Z^2$ is shiftable so as to disengage the gear $z$ from the gear 81 and to engage its clutch teeth $z'$ with the clutch teeth $x^2$ on the sleeve 77. The member $Z^2$ is held concentrically with the member Z' by means of the annular ball series 82 and 83 and it is yieldably retained against rotation by means of a series of balls 84 retained in radial holes in the member Z' and pressed by springs 85 into a circumferential series of seats 86 formed on the inner circumference of the member $Z^2$. This device constitutes a means for permitting slip in case either the table, the knee, or the saddle, should encounter an undue resistance in their movements; thereby avoiding the possibilty of breakage. The above described arrangement may be bodily shifted as a unit by means of a yoke 53 secured to a rod Z extending forwardly through the front wall of the feed box V and terminating in an operating knob accessible from the front of the machine. The part Z' is splined to the shaft 26 so that by shifting the three gear units above mentioned, this shaft 26 may derive any one of twelve different speeds from the shaft 24.

The table, the knee, and the saddle, respectively, all derive their motions from the shaft 26 which at its rearward end carries a gear 31 permanently enmeshed with a gear 32 journaled on a stub shaft 27. The table is propelled by a transmission extending from this gear 32 as follows: The side of the knee B is provided with a housing 87 of an annular shape which provides a journal 88 for supporting the rear end of a short splined shaft 28 which extends horizontally through the forward open end of the housing 87 through a bearing sleeve 89 carried by a housing 90 which extends downwardly from the left hand side of the saddle C. A cap 91 is secured to the forward face of the housing 90 and covers the free end of the splined shaft 28. This shaft 28 derives its motion from the gear 32 by means of a gear 34 keyed to said shaft and retained against lateral movement by means of an annular plate 92 held in the open side of the housing 87 by means of screws 93. The housing 90 depending from the saddle supports a vertical shaft 94 (see Figs. 9 and 10) to the lower end of which is affixed a beveled gear 40 in permanent mesh with a beveled gear 39 splined to the shaft 28 and journaled in the housing 90. At its upper end, the vertical shaft 94 is provided with a beveled gear 41 meshing with a beveled gear 42 horizontally journaled in the saddle C and provided with clutch teeth 95 adapted to be engaged by the complementary teeth 96 on the shiftable clutch member 43 which is splined to a sleeve 97 provided with a feather 98 within the groove of the feed screw 99 which is journaled at each end in the table D so as to shift the same. A fixed nut 100 secured to the saddle C serves to effect a longitudinal displacement of the lead screw as the latter is rotated, either by power, as above described, or manually by means of the handle 101 directly secured to its left hand end, or manually by means of the crank 102 arranged at its right hand end and operating through the shaft 103, the gear 104, and the pinion 105 secured to the left hand end of the lead screw.

The trip mechanism for controlling the power feed of the table comprises a horizontal shaft 45 journaled in the saddle and having a roller 46 at its rear end operating in the annular groove $42^x$ to shift the clutch 43. This shaft 45 is retained in its position by means of a detent device 106 and terminates at its forward end in an operating handle 47 (for manual control) and a stud 48 adapted to be impacted by a dog 49 adjustably fixed to the forward horizontal edge of the table for the purpose of drawing the shaft 45 either to the right or left, as the case may be, for the purpose of disengaging the feed of the table.

The feed of the saddle is effected by a transmission deriving motion from the gear 32 journaled on the shaft 27 in the knee. This transmission includes a shiftable clutch member 107 having a wide gear 108 permanently meshing with gear 32 and journaled on a stud 109. Gear 108 also meshes with a gear 110 carried by a shiftable member 111 provided with clutch teeth 112 and mounted on the stationary stud 113 so as to be shiftable thereon to engage its clutch teeth 112 with teeth 114 provided by a sleeve 115 keyed to the cross screw 116 which is journaled at its very end in the knee and is externally provided with an operating handle 117 for the purpose of effecting the hand feed of the saddle. Said saddle is provided with a depending nut 118 in screw-threaded engagement with the cross screw 116 for the purpose of feeding the saddle, as will be understood. In order to effect the feed by power, it is only necessary to shift the member 111 which is done (see Fig. 18) by means of a yoke 119 secured to a shaft 120 terminating on the right hand side of the knee in a lever 121, shown on Fig. 3. This lever carries a detent mechanism at 122 so that it may remain in its predetermined position and in order that the cross feed of the saddle may be tripped automatically, a dog 123 is adjustably secured to the right hand edge of the saddle and operates against a roller 124 carried by said lever.

The vertical feed of the knee derives its motion from the clutch member 107 (see Fig. 11) which is continuously rotated by the gear 32 and is provided with clutch teeth 125 adapted to engage complementary clutch teeth 126 on the shaft 29 so as to rotate the latter. This shifting is effected by lever 127 which is secured to shaft 128, which in turn carries a yoke 129 riding in the annular grove 130 of the shiftable member 107. When the shaft 29 is driven by power as a result of the operation of this lever, the gear 33 rotates a member 38 to which the vertical lifting screw 39 is keyed. This screw passes through a nut 131 in the upper end of a post 132 bolted to and uprising from the base of the column.

It will thus be seen that this invention provides a simple solution of a difficulty that has heretofore occasioned the art considerable bother, and that, by this method, a very satisfactory assembled unit is easily and accurately derived.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure by Letters Patent of the United States:—

1. A machine tool organization combining a stationary frame-element; a shiftable frame-element; a transmission shaft journaled on the one element and in translatable relation with the other element; and a telescopic casing enclosing said shaft.

2. A milling machine combining a stationary frame-element; a vertically movable frame-element adjustably carried thereby; a table slidingly supported upon said movable frame-element; a feed-change mechanism carried by said movable frame-element; a vertical drive shaft journaled externally at the side of said movable frame-element and operatively connected with said feed change mechanism; a feed screw for propelling the table; and means including a splined connection for rotating said feed screw from said shaft in all vertical positions of said movable frame elements.

3. A milling machine combining a column; a horizontal shaft in said column; a vertical shaft located externally of said column; a shaft inclined in a vertical plane; a first pair of beveled gears connecting said shaft with said horizontal shaft; and a second pair of beveled gears connecting said shaft with said vertical shaft.

4. A milling machine combining a column; a shaft extending vertically externally of said column; a knee vertically slidable on said column and having a bracket extending towards said shaft; a gear splined to said shaft and journaled in said bracket; a telescopic casing enclosing said shaft and connected to said bracket; and a transmission journaled in said bracket deriving motion from said splined gear.

5. A machine tool combining a work supporting member provided with drain passages for a coolant; a base having a reservoir for said coolant; and a vertically extending telescopic conduit for returning said coolant from the work supporting member to said reservoir.

6. A milling machine combining a knee; a power shaft journaled at one end in a journal supported by said knee and extending through a journal in a part depending from the saddle; a transmission in the knee for rotating said shaft; and a transmission in the saddle for deriving motion from said shaft.

7. A milling machine combining a knee; a casing containing feed change gears bolted to one side of said knee; two manually operated plungers projecting forwardly through the end of said casing for operating change gears; an index plate secured to the front face of said casing; and a pivoted lever having a finger registering with said index plate and adapted to control the position of a change gear within said casing.

8. A milling machine combining a column, a knee, a saddle and a table; a transmission shaft extending from one side of the column to a transmission element supported by the knee, and a telescopic casing enclosing said shaft.

9. A milling machine combining a column; a transmission shaft extending vertically from an upper portion thereof into its base; a knee vertically adjustable on said column; a pump located in the base and driven by said shaft; a gear splined to said shaft to shift longitudinally thereof; and a transmission system deriving motion from said splined gear in all vertical positions of the knee.

In witness whereof, I hereunto subscribe my name, as attested by the two subscribing witnesses.

ROBERT T. HAZELTON.

Witnesses:
SOL ENISTEIN,
W. PEASLER.